(12) United States Patent
Chumbalkar et al.

(10) Patent No.: US 10,515,040 B2
(45) Date of Patent: Dec. 24, 2019

(54) DATA BUS HOST AND CONTROLLER SWITCH

(71) Applicant: Lenovo (Singapore) Pte. Ltd., Singapore (SG)

(72) Inventors: Nagananda Chumbalkar, Cary, NC (US); Justin Potok Bandholz, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 637 days.

(21) Appl. No.: 14/024,412

(22) Filed: Sep. 11, 2013

(65) Prior Publication Data

US 2015/0074323 A1 Mar. 12, 2015

(51) Int. Cl.
*G06F 13/40* (2006.01)

(52) U.S. Cl.
CPC .......... *G06F 13/4022* (2013.01); *G06F 13/40* (2013.01)

(58) Field of Classification Search
CPC .............................. G06F 13/4022; G06F 13/40
See application file for complete search history.

(56) References Cited

U.S. PATENT DOCUMENTS

| | | | | |
|---|---|---|---|---|
| 7,207,059 B1 * | 4/2007 | Kurian | ................. | G06F 3/0227 380/270 |
| 7,675,354 B2 * | 3/2010 | Kinsella | ............... | H03K 17/063 327/540 |
| 7,877,788 B1 * | 1/2011 | Topp | ...................... | G06F 21/85 713/189 |
| 2008/0109587 A1 * | 5/2008 | Greenhalgh | ........ | G06F 13/4022 710/316 |
| 2009/0177809 A1 * | 7/2009 | Bhesania | ............ | H04L 43/0811 710/19 |
| 2010/0235655 A1 * | 9/2010 | Tauscher | ................. | G06F 1/266 713/300 |
| 2010/0299464 A1 * | 11/2010 | Cullum | ................. | G06F 13/387 710/63 |
| 2011/0307639 A1 | 12/2011 | Dai | | |
| 2013/0007430 A1 * | 1/2013 | Fan | ........................ | G06F 8/654 713/1 |

OTHER PUBLICATIONS

Fujitsu, ARC Processor Core, 2000 (2 pages).
USB-IF USB 2.0 Electrical Test Specification Version 1.03, Jan. 2005 (15 pages).
Intel S5000 Server Board Family Datasheet, Revision 1.3, Aug. 31, 2007 (179 pages).

(Continued)

*Primary Examiner* — Tim T Vo
*Assistant Examiner* — Phong H Dang
(74) *Attorney, Agent, or Firm* — Brian J. Pangrle

(57) ABSTRACT

An apparatus can include a processor; a controller; a data bus connector; a multiplexer operatively coupled to the data bus connector where the multiplexer includes a controller coupled state operatively coupled to the controller and a processor coupled state operatively coupled to the processor; and circuitry that responds to a signal received via the data bus connector to determine the coupled state of the multiplexer as being one of the controller coupled state and the processor coupled state. Various other apparatuses, systems, methods, etc., are also disclosed.

18 Claims, 11 Drawing Sheets

(56) References Cited

OTHER PUBLICATIONS

Intel 631xESB/632xESB I/O Controller Hub Interfaces Signals Block Diagram, Fig. 2-1, May 2006 at p. 52 (1 page).
Texas Instruments, Digital Bus Switch Selection Guide, 2004 (24 pages).
IPMI, Intelligent Platform Management Interface Specification, Second Generation, v2.0 Jun. 12, 2009 Markup of Feb. 12, 2004 Document Revision 1.0 (644 pages).
Intel Server Board S4600LH Product Family, 2012 (2 pages).
Silicon Laboratories Inc. USB Bridge Solutions, 2010 (2 pages).
Aspeed, AST2050 User Guide V1.01 2010 (41 pages).
Aspeed, AST2050/ AST1100 Integrated Remote Management Processor Datasheet 2010 (403 pages).

* cited by examiner

DATA BUS HOST AND CONTROLLER SWITCH

TECHNICAL FIELD

Subject matter disclosed herein generally relates to technologies and techniques for data bus switching.

BACKGROUND

A device may include numerous data ports where, for example, the data ports include a data port for one component and a data port for another component of the device. Such an approach may enhance security, logistics, etc., for example, where one component is a controller and the other component is a processor (e.g., for running an operating system). For some devices, multiple ports may be confusing, cumbersome and, for example, introduce design limitations. Various technologies and techniques described herein can provide for switching of a single data port.

SUMMARY

An apparatus can include a processor; a controller; a data bus connector; a multiplexer operatively coupled to the data bus connector where the multiplexer includes a controller coupled state operatively coupled to the controller and a processor coupled state operatively coupled to the processor; and circuitry that responds to a signal received via the data bus connector to determine the coupled state of the multiplexer as being one of the controller coupled state and the processor coupled state. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Figure 1:
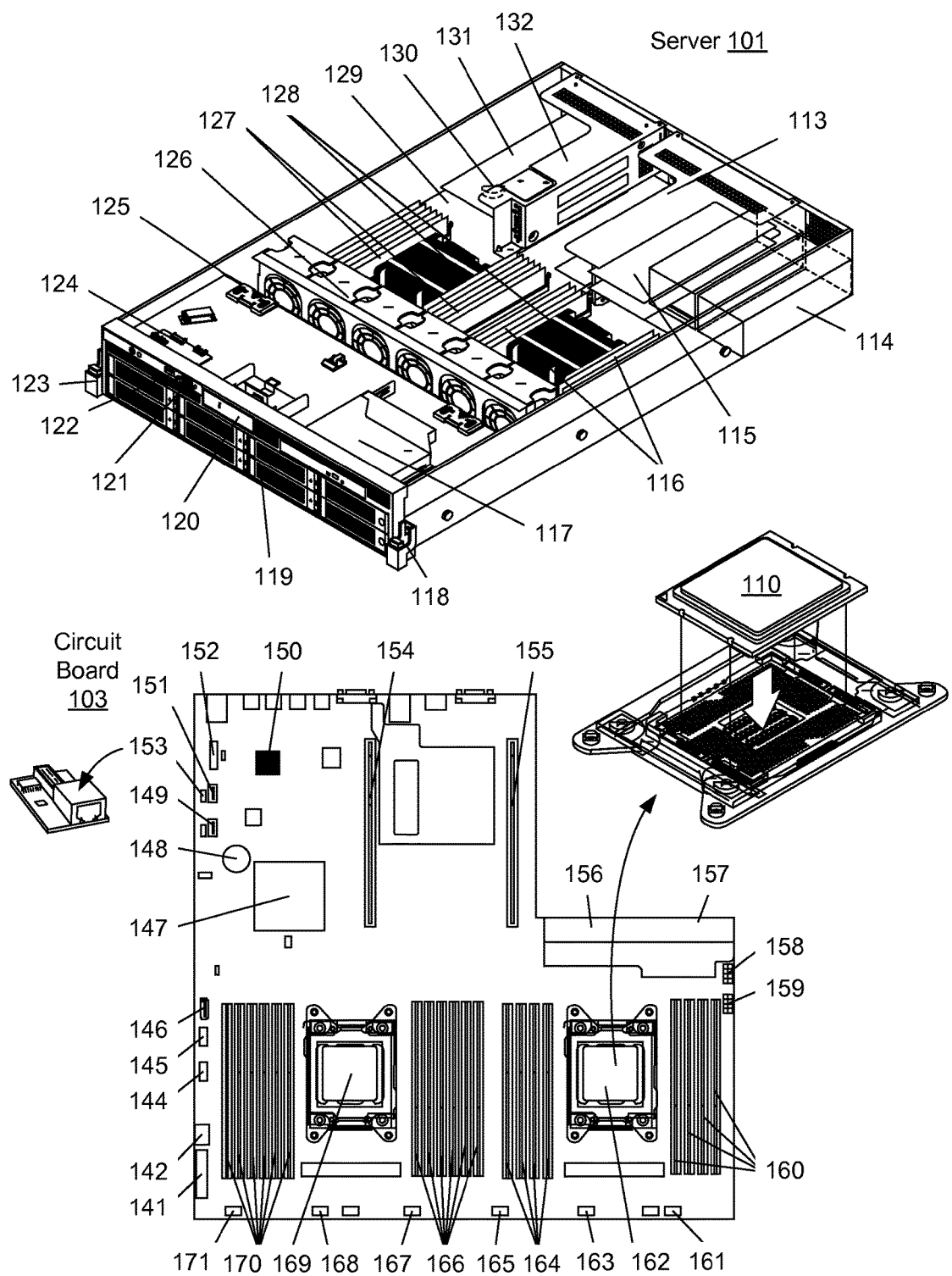
FIG. 1 is a diagram of an example of a server and an example of a board with various components.

FIG. 1 shows an example of a server 101 and an example of a circuit board 103 that may be part of the server 101. As shown in the example of FIG. 1, the server 101 can include a riser card assembly 113, one or more hot-swap power supplies 114, one or more PCI-express card 115, a first set of DIMMs 116 (e.g., processor-accessible memory slots, memory modules, etc.), an optical drive 117, a right-side rack handle 118, a hard disk drive area 119, a diagnostic module 120, a VGA DB-connector 121, a USB port 122, a left-side rack handle 123, a front panel board 124, a backplane for hard disk drives 125, system fans 126, a second set of DIMMs 127, heat sinks (e.g., with processors beneath) 128, a circuit board (e.g., or system board) 129, a circuit board battery 130, one or more other PCI-express cards 131 and another riser card assembly 132.

As to the circuit board 103, it may be suitable for use as the circuit board 129 of the server 101. As shown in the example of FIG. 1, the circuit board 103 can include a front panel connector 141, an internal USB connector 142, a diagnostic module connector 144, a front VGA connector 145, a SATA connector 146, a platform controller hub (PCH) 147, a circuit board battery 148, an internal USB Type A port 149, a controller 150, another internal USB Type A port 151, a TPM (Trusted Platform Module) connector 152, a controller connector module 153, a riser card assembly slot 154, another riser card assembly slot 155, a power supply connector 156, another power supply connector 157, a backplane power connector 158, another backplane power connector 159, memory slots 160, 164, 166 and 170, system fan connectors 161, 163, 165, 167, 168 and 171 and processor sockets 162 and 169 where each of the processor sockets 162 and 169 may seat a respective processor (see, e.g., a perspective view of the processor socket 162 and a processor 110).

As an example, a processor may be in the form of a chip (e.g., a processor chip) that includes one or more processing cores. As an example, a processor socket may include protruding pins to make contact with a pads of a processor chip, which may be, for example, a multicore processor chip (e.g., a multicore processor). As an example, a processor socket may include features of a "Socket H2" (Intel Corp, Santa Clara, Calif.), a "Socket H3" (Intel Corp, Santa Clara, Calif.), "Socket R3" (Intel Corp, Santa Clara, Calif.) or other socket. As an example, a processor chip (e.g., processor) may optionally include more than about 10 cores (e.g., "Haswell-EP", "Haswell-EX", etc. of Intel Corp.). As an example, a processor chip may include one or more of cache, an embedded GPU, etc.

In the example of FIG. 1, the server 101 may have limited "real-estate" on its front side (e.g., front facing surface area). As an example, real-estate may be optimized by including a limited number of ports. For example, as shown the server 101 may include the single USB port 122. In such an example, the single USB port 122 may be operatively coupled to the internal USB connector 142 of the circuit board 103, for example, via a USB cable that extends from a back-side of the single USB port 122 to the internal USB connector 142 of the circuit board 103.

As an example, placement of multiple USB data ports (e.g., a controller USB data port and a processor USB data port) on a user accessible front surface requires space and can be considered a limiting design criterion. In turn, where servers are stacked, the increased front surface area is multiplied. For example, an extra 15 millimeters in front surface height may translate to an extra 225 millimeters for a stack of 15 servers (e.g., a server rack stacked 15 in height). Thus, where few ports may be provided (e.g., fewer ports compared to another unit), space saving may be multiplied by a number of units (e.g., as stacked vertically, horizontally, etc.).

As to the USB Type A ports 149 and 151 of the circuit board 103, these may include USB host circuitry such that, for example, the circuit board 103 can act like a USB host.

As to the controller connector module 153 of the circuit board 103, it may provide for remote "keyboard, video and mouse" (KVM) access and control through the LAN or Internet in conjunction with the controller 150, which may be a baseboard management controller (BMC). As an example, the controller connector module 153 may provide for location-independent remote access to one or more circuits of the circuit board 103, for example, to respond to incidents, to undertake maintenance, etc.

As an example, the controller connector module 153 may include features such as an embedded web server, a soft keyboard via KVM, remote KVM, virtual media redirection, a dedicated Network Interface Card (NIC), security (e.g., SSL, SSH, KVM encryption, authentication using LDAP or RADIUS), email alert, etc.

Figure 2:
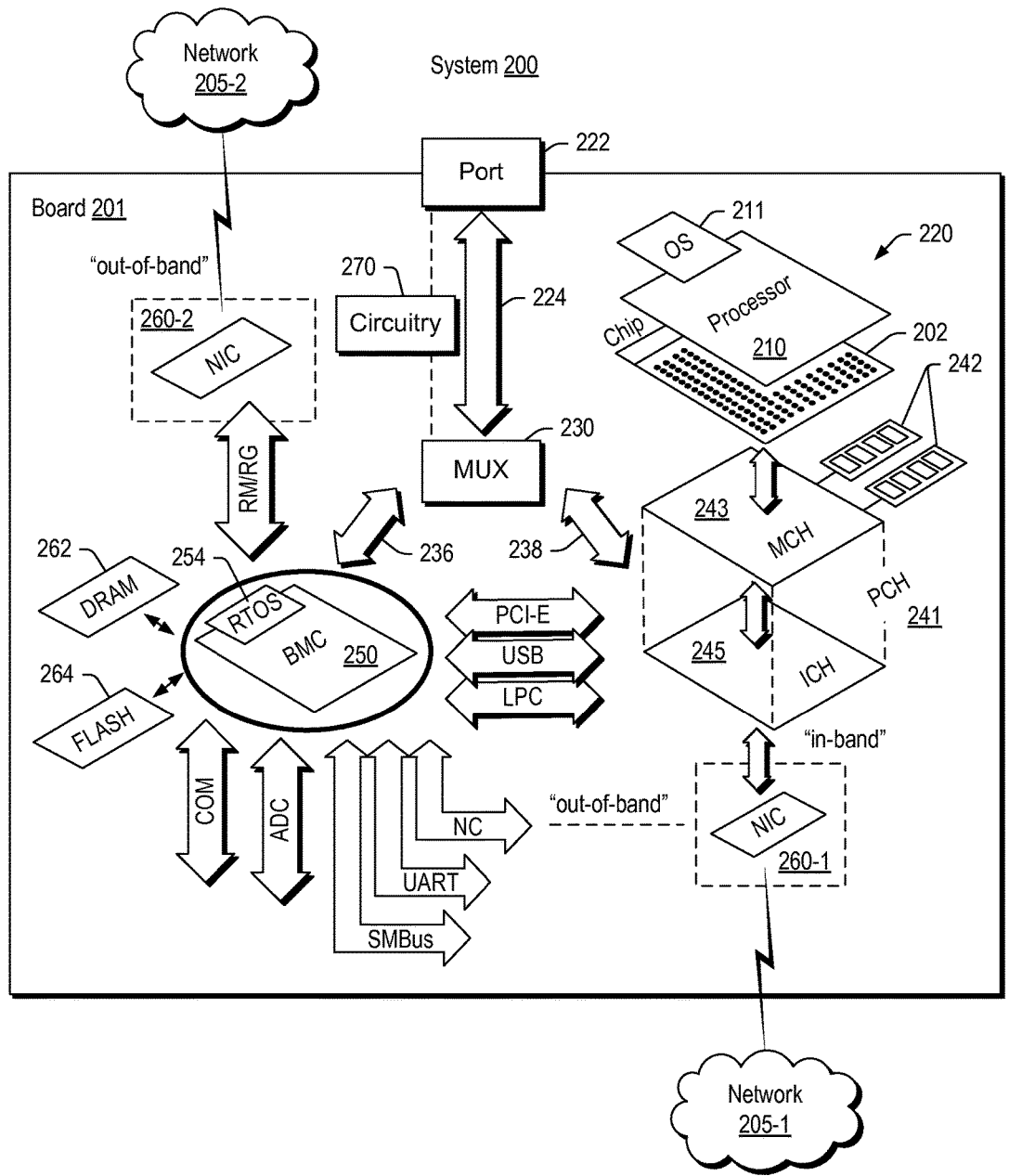
FIG. 2 is a diagram of an example of a system that includes a controller and a processor as well as a port and a multiplexer.

FIG. 2 shows an example of a system 200 that includes a board 201 for a processor chip 202, for a platform controller host (PCH) 241 and for a controller 250, which may be referred to as a baseboard management controller (BMC). In the example of FIG. 2, the board 201 includes a port 222 operatively coupled via a bus 224 to a multiplexer 230 that is selectively, operatively coupled to the controller 250 via a first bus 236 and to the PCH 241 via a second bus 238. As an example, the system 200 may include circuitry 270, which may be configured to signal switching of the multiplexer 230, for example, to operatively couple the port 222 to the controller 250 or to the PCH 241. As an example, the port 222 may be a USB port. For example, the port 222 may be a USB port of a server such as the server 101 of FIG. 1.

In the example of FIG. 2, the board 201 may be configured for so-called "in-band" and "out-of-band" communication via a network 205-1 and, for example, for "out-of-band" communication via a network 205-2, which may optionally be or optionally include the network 205-2.

As shown in the example of FIG. 2, the processor chip 202 includes a processor 210 that may execute an operating system 211, for example, to establish an operating system environment. In the example of FIG. 2, the processor chip 202 is operatively coupled to a memory controller host (MCH) 243 and an input/output controller host (ICH) 243, which may be, for example, components of the PCH 241. The MCH 243 is operatively coupled to "system" memory 242 (see, e.g., the DIMMs 160, 164, 166 and 170 of the circuit board 103 of FIG. 1) and the ICH 245 is operatively coupled to a network interface controller (NIC) 260-1. The components illustrated as a vertical stack (right hand side of FIG. 2) may be considered "host" components (e.g., a host 220) that support the establishment of an operating system environment using the processor 210, for example, to execute applications.

In the example of FIG. 2, the controller 250 includes a RTOS 254 and various interfaces. As an example, the controller 250 may include dedicated network support, for example, via an optional NIC 260-2. As an example, the NIC 260-1 and/or the NIC 260-2 may provide for out-of-band (OOB) communication with the controller 250 (e.g., via the network 205-1 and/or the network 205-2; see, e.g., the module 153 of FIG. 1). As an example, a controller may include an IP address, for example, that may differ from an IP address associated with host components on a board. In the example of FIG. 2, the controller 250 may also include interfaces to access components such as, for example, DRAM 262, flash (e.g., optionally SPI flash) 264, etc. The controller 250 may include interfaces for communication with one or more of the MCH 243 and the ICH 245, for example, via a PCI-express interface (PCI-E), a USB interface, a low pin count interface (LPC), etc. The controller 250 may include an interface configured in compliance with a SMB specification (e.g., a "SMBus" specification). Such an interface may be configured for communications, control, data acquisition, etc. with one or more components on a motherboard (e.g., power related components, temperature sensors, fan sensors, voltage sensors, mechanical switches, clock chips, etc.).

As an example, the controller 250 may be optionally compliant with an Intelligent Platform Management Interface (IPMI) standard. The IPMI may be described, for example, as a message-based, hardware-level interface specification. In a system, an IPMI subsystem may operate independently of an OS (e.g., host OS), for example, via out-of-band communication. The IPMI may be suitable for use by a system administrator, for example, to perform out-of-band management of a system (e.g., monitoring operation, etc.).

In the example of FIG. 2, an OS environment may be established using, for example, a WINDOW® OS (e.g., a full OS), an APPLE® OS, an ANDROID® OS or other OS capable of establishing an environment for execution of applications (e.g., word processing, drawing, email, etc.). As an example, the controller 250 may establish an RTOS such as, for example, the NUCLEUS® RTOS, a RISC OS, embedded OS, etc.

As an example, the controller 250 may be an ARC controller that can function as a baseboard management controller (BMC) (e.g., an ARC4 processor with an I-cache, a D-cache, SRAM, ROM, etc.). As an example, a BMC may include an expansion bus, for example, for an external flash PROM, external SRAM, and external SDRAM. A BMC may be part of a management microcontroller system (MMS), which, for example, operates using firmware stored in ROM (e.g., optionally configurable via EEPROM, strapping, etc.).

As an example, the controller 250 may include an ARM architecture, for example, consider a controller with an ARM926 32-bit RISC processor. As an example, a controller with an ARM architecture may optionally include a Jazelle® technology enhanced 32-bit RISC processor with flexible size instruction and data caches, tightly coupled memory (TCM) interfaces and a memory management unit (MMU). In such an example, separate instruction and data AMBA® AHB™ interfaces suitable for Multi-layer AHB based systems may be provided. The Jazelle® DBX (Direct Bytecode eXecution) technology, for example, may provide for execution of bytecode directly in the ARM architecture as a third execution state (and instruction set) alongside an existing mode.

As an example, the controller 250 may be configured to perform tasks associated with one or more sensors (e.g., scanning, monitoring, etc.), for example, as part of an Intelligent Platform Management Interface (IPMI) management scheme. As an example, a sensor may be or include hardware sensor (e.g., for temperature, etc.) and/or a software sensor (e.g., for states, events, etc.). As an example, a controller (e.g., a BMC) may provide for out-of-band management of a computing device (e.g., an information handling system), for example, via a network interface.

As an example, a controller may be configured to implement one or more server-related services. For example, a chipset may include a server management mode (SMM) interface managed by a BMC. In such an example, the BMC may prioritize transfers occurring through the SMM interface. In such an example, the BMC may act as a bridge between server management software (SMS) and IPMI management bus (IPMB) interfaces. Such interface registers (e.g., two 1-byte-wide registers) may provide a mechanism for communications between the BMC and one or more host components.

As an example, the NIC 260-1 of the system 200 of FIG. 2 may be a LAN subsystem PCI bus network adapter configured to monitor network traffic, for example, at a so-called Media Independent Interface. Upon detecting a particular packet frame (e.g., optionally in a "magic" packet), NIC 260-1 may assert a wake-up signal, for example, that powers up a device (e.g., an information handling device such as a computer). While a magic packet is mentioned, wake capabilities may occur, for example, responsive to receipt of a PCI Express WAKE# signal, a ping, etc. For example, reception of a network wake-up packet (e.g., magic or other), detection of a link change of state, etc. may result in waking. While LAN is mentioned, as an example, a signal (e.g., a command, a packet or other information) may be received via cellular circuitry, infra-red circuitry or other type of communication circuitry.

As an example, the NIC 260-1 may include various features, for example, a network adapter may include a Gigabit Ethernet controller, a RJ-45 LAN connector, a CSMA/CD protocol engine, a LAN connect interface between a PCH and a LAN controller, PCI bus power management, ACPI technology support, LAN wake capabilities, ACPI technology support, LAN subsystem software, etc.

As an example, a network adapter (e.g., a NIC, etc.) may be chip-based with compact, low power components with Gigabit Ethernet Media Access Control (MAC) and Physical Layer (PHY) port. Such a network adapter may use the PCI-express (PCI-E) architecture, for example for implementation as a LAN on a motherboard (LOM) configuration or, for example, embedded as part of a switch add-on card, a network appliance, etc. (e.g., consider a NIC-based controller for a NIC of a motherboard).

As an example, the board 201 may include components such as those marketed by Intel Corporation (Santa Clara, Calif.). As an example, one or more components may support the Intel® Active Management Technology (AMT), as a hardware-based technology for remotely managing and securing computing systems in out-of-band operational modes. Intel® AMT is a set of remote management and security features designed into hardware that can, for example, allow a system administrator with AMT security privileges to access system information and perform specific remote operations on a system that includes the hardware. As an example, such remote operations may include remote power up/down (e.g., via wake on LAN), remote/redirected boot (e.g., via integrated device electronics redirect, or IDE-R), console redirection (e.g., via serial over LAN), and other remote management and security features.

As an example, a network adapter may include one or more features of an Intel® Ethernet controller, for example, as described in a document entitled "Intel® 82583V GbE Controller" (Rev. 2.5, June 2012), which is incorporated by reference herein.

As an example, a controller may store configuration information in protected memory (see, e.g., the DRAM 262, the flash 264, etc.). As an example, the information may include the name(s) of appropriate "whitelist" management servers (e.g., for a company, etc.). As an example, the controller 250 may be operable in part by using instructions stored in memory such as the DRAM 262 and/or the flash 264. As an example, such instructions may provide for implementation of one or more methods that include monitoring, assessing, etc. operation of the processor chip 202 by the controller 250.

As an example, the system 200 may be part of a server. For example, consider a RD630 ThinkServer® system sold by Lenovo (US) Inc. of Morrisville, N.C. Such a system may include, for example, multiple sockets for processors. As an example, a processor may be an Intel® processor (e.g., XEON® E5-2600 series, XEON® E3-1200v3 series (e.g., Haswell architecture), etc.). As an example, a server may include an Intel® chipset, for example, such as one or more of the Intel® C6XX series chipset. As an example, a server may include RAID hardware (e.g., RAID adapters). As an example, a server may include hypervisor instructions for establishing a hypervisor environment, for example, to support virtual OS environments, etc.

As an example, a device or system may include a processor; a controller; a data bus connector; a multiplexer operatively coupled to the data bus connector where the multiplexer includes a controller coupled state operatively coupled to the controller and a processor coupled state operatively coupled to the processor; and circuitry that responds to a signal received via the data bus connector to determine the coupled state of the multiplexer as being one of the controller coupled state and the processor coupled state. For example, the port 222 of the system 200 of FIG. 2 may be a data bus connector where the multiplexer 230 may include a controller coupled state operatively coupled to the controller 250 and a processor coupled state operatively coupled to the processor 210 and, for example, where the circuitry 270 is configured to respond to a signal received via the port 222 to determine the coupled state of the multiplexer 230 as being one of the controller coupled state and the processor coupled state.

Figure 3:
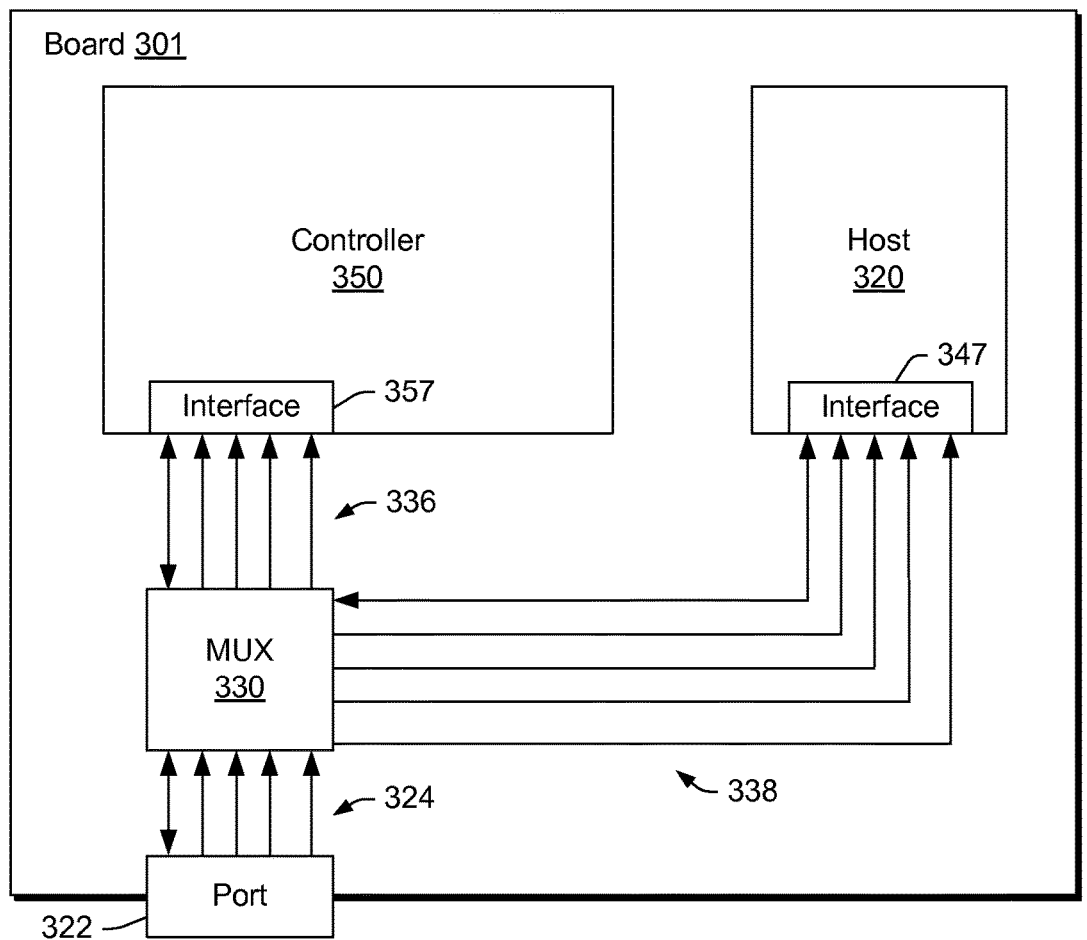
FIG. 3 is a diagram of an example of a system that includes a multiplexer.

FIG. 3 shows an example of a system 300 that includes a board 301 with various components, including a host 320 with an interface 347, a data port 322, a multiplexer 330, and a controller 350 with an interface 357. As shown, the data port 322 is operatively coupled to the multiplexer 330 via wires 324, which is operatively coupled to the interface 347 of the host 320 via wires 338 and the interface 357 of the controller 350 via wires 336.

As an example, the data port 322 may be a single USB data port for the board 301 or, for example, a single USB data port for coupling to a USB connector on a front surface of a server. In such a manner, the data port 322 may be considered to be a single high-density connector.

In the example of FIG. 3, the system 300 can accommodate both service use (e.g., via the controller 350) and host system use (e.g., via the host 320) of a shared USB port (e.g., the data port 322). In such an example, circuitry may automatically switch the multiplexer 330 to a correct endpoint, for example, based on information included in a packet (e.g., a type of "magic" packet, etc.) received via the data port 322. In such an example, the multiplexer 330 can ensure that the endpoint is either the controller 350 or the host 320 (e.g., host system under an operating system, etc.).

As an example, a system may be a host computer system with a USB port (e.g., pins), a BMC with a USB port (e.g., pins), a standard USB connector (e.g., data port to external environment), a hot-remove detector connected to the USB connector, and a two-port USB multiplexer (e.g., two sets of pins) that connects to the host system and the BMC and is controlled by the BMC.

As an example, a method can include operatively connecting, via a multiplexer, a USB data port (e.g., a USB connector) to a BMC in a default state of the multiplexer (e.g., controller coupled state); discovering a USB device connected to the USB data port; enumerating the USB device by the BMC; scanning the USB device by the BMC for a file that includes an appropriate signature (e.g., a "magic" packet, etc.); and, if a found signature matches a pre-determined signature (e.g., stored or otherwise accessible by the BMC), the BMC determines that the multiplexer is to be pointed to the BMC (e.g., remain in a default state to the BMC); however, if no signature or an incorrect signature is found then the BMC can switch the direction of the multiplexer to a host system (e.g., processor coupled state). Such a method may help to ensures that the host system detects a hot-add of a USB device, which may be akin to a normal operating scenario on systems that do not include the aforementioned multiplexer and associated circuitry (e.g., logic, etc.).

As an example, the aforementioned method may continue in a BMC coupled state for the USB device coupled to the USB data port where the BMC interacts with the USB device. In such an example, the BMC may, at a later time, perform actions that are requested via contents in the USB device (e.g., a firmware update, etc.). As an example, the BMC may, optionally, monitor hot-removal of the USB device and, for example, in response, return to a default state (e.g., a waiting state). As an example, logic may be configurable, for example, given sufficient security measures to avoid breaching the system. As an example, a BMC may monitor the state of a hot-remove detector and, for example, if it detects a hot-remove of a USB device, determine that a multiplexer state is to be a BMC coupled state. In such an example, if the state is not a BMC coupled state, the BMC may issue a signal to the multiplexer to change to a BMC coupled state. As an example, on a power reset (e.g., power on, change in sleep state, etc.), a multiplexer may be maintained or switched to a BMC coupled state.

Figure 4:
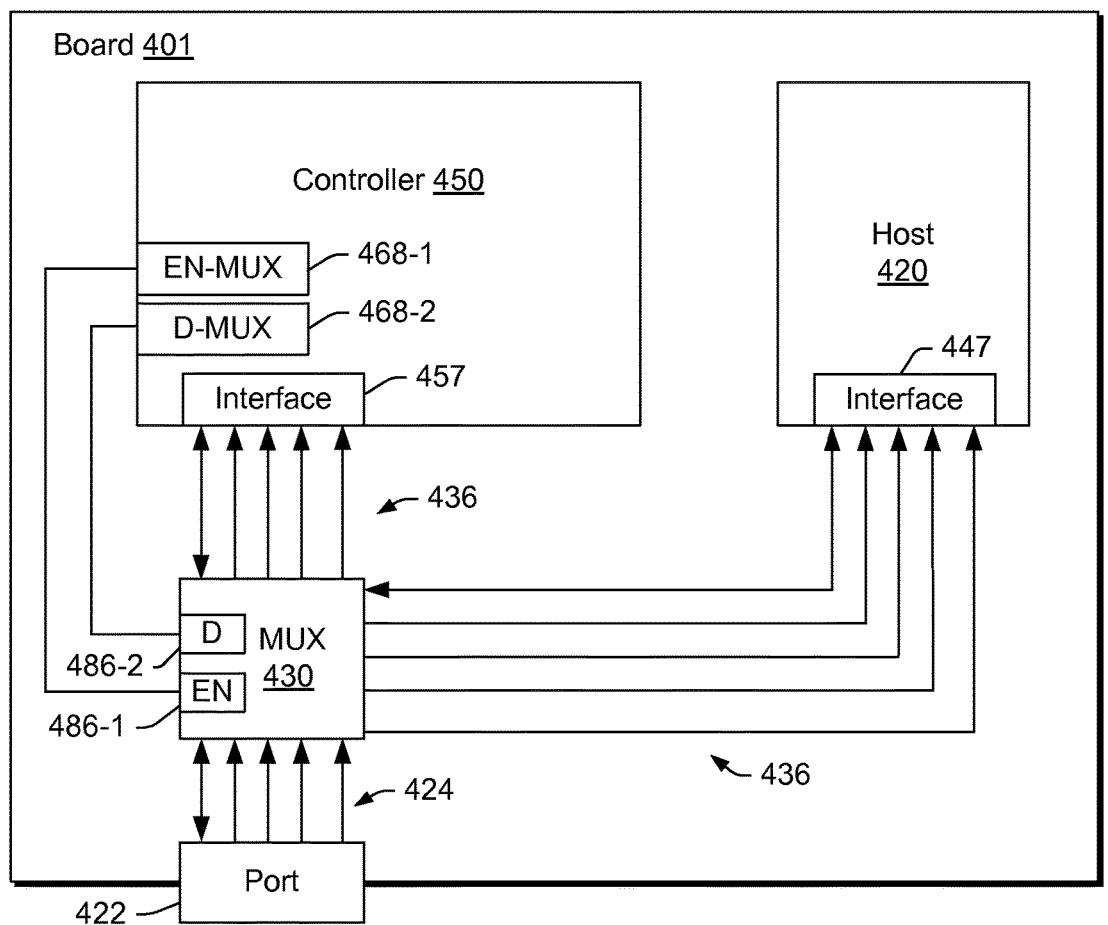
FIG. 4 is a diagram of an example of a system that includes a multiplexer.

FIG. 4 shows an example of a system 400 that includes a board 401 with various components, including a host 420 with an interface 447, a data port 422, a multiplexer 430, and a controller 450 with an interface 457. As shown, the data port 422 is operatively coupled to the multiplexer 430 via wires 424, which is operatively coupled to the interface 447 of the host 420 via wires 438 and the interface 457 of the controller 450 via wires 436.

The system 400 of FIG. 4 also includes circuitry 468-1 and 468-2 of the controller 450 that operatively couples with circuitry 486-1 and 486-2 of the multiplexer 430. For example, the circuitry 468-1 and 486-1 may provide for enabling the multiplexer 430 for switching and the circuitry 468-2 and 486-2 may provide for switching. As shown in FIG. 4, wires are provided, for example, to operatively couple the circuitry 468-1 and 468-1 and the circuitry 468-2 and 486-2.

Figure 5:
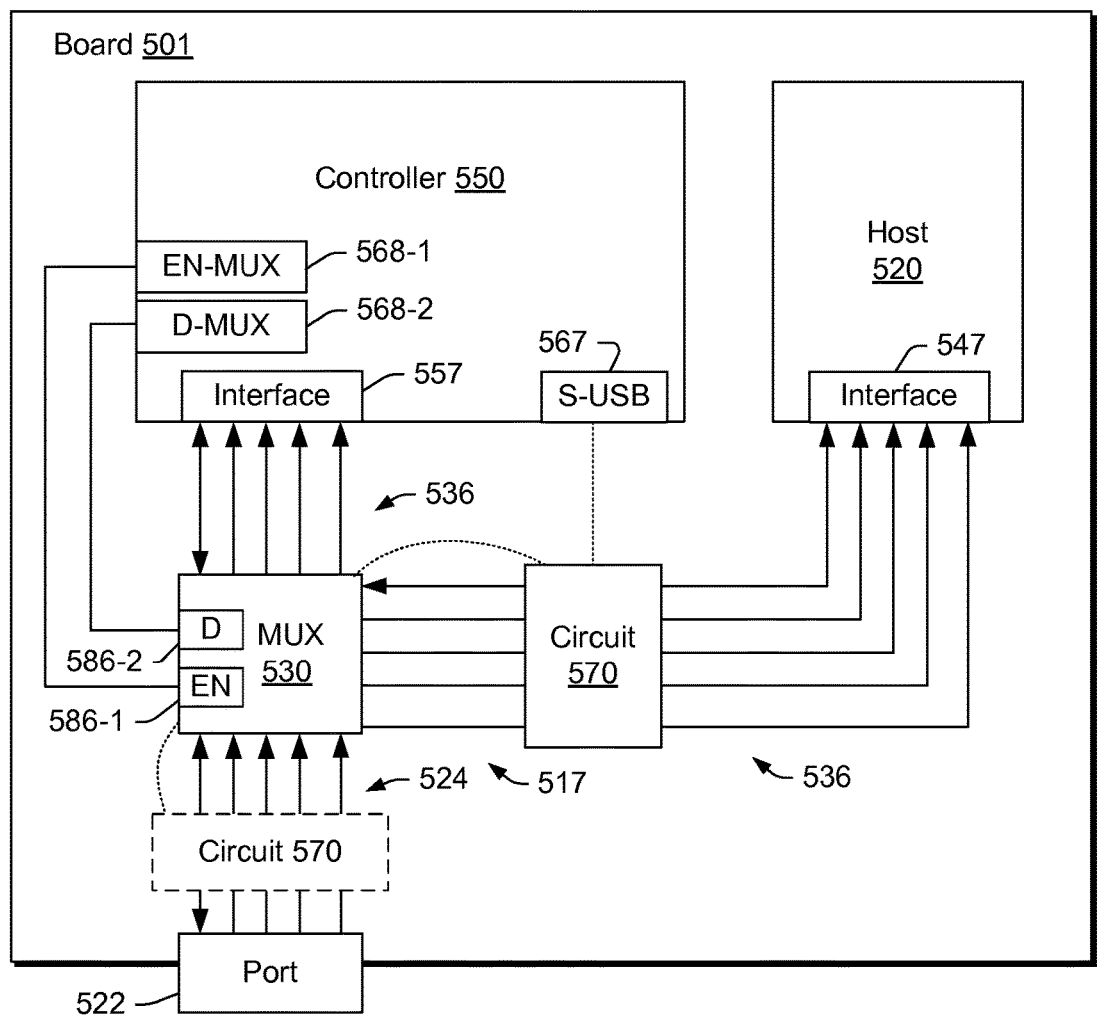
FIG. 5 is a diagram of an example of a system that includes a multiplexer.

FIG. 5 shows an example of a system 500 that includes a board 501 with various components, including a host 520 with an interface 547, a data port 522, a multiplexer 530, and a controller 550 with an interface 557. As shown, the data port 522 is operatively coupled to the multiplexer 530 via wires 524, which is operatively coupled to the interface 547 of the host 520 via wires 538 and the interface 557 of the controller 550 via wires 536. The system 500 of FIG. 5 also includes circuitry 568-1 and 568-2 of the controller 550 that operatively couples with circuitry 586-1 and 586-2 of the multiplexer 530. For example, the circuitry 568-1 and 586-1 may provide for enabling the multiplexer 530 for switching and the circuitry 568-2 and 586-2 may provide for switching. As shown in FIG. 5, wires are provided, for example, to operatively couple the circuitry 568-1 and 568-1 and the circuitry 568-2 and 586-2.

FIG. 5 also shows the system 500 as including circuitry 570 and circuitry 567 of the controller 550 as well as a wired bus 517 intermediate the circuitry 570 and the multiplexer 530. In the example of FIG. 5, the circuitry 570 may be a hot-remove detector that can detect removal of a device from the data port 522 and, for example, output a signal to the circuitry 567 of the controller 550. Such a signal may indicate one or more states for the data port 522, for example, consider a USB connected state and a USB disconnected state. As an example, upon disconnection at a USB port (e.g., the port 522), circuitry may automatically set a multiplexer to a particular state. For example, disconnection at a USB port may cause a multiplexer to point to a controller (e.g., a baseboard management controller). As an example, circuitry may include "hot-remove" circuitry that can generate a signal that can control a multiplexer upon removal of a device from a port (e.g., removal of a USB device from a USB port).

As an example, the circuit 570 may be operatively coupled to the multiplexer 530, be part of the multiplexer 530 or, for example, operatively coupled along the bus 524 between the port 522 and the multiplexer 530.

Figure 6:
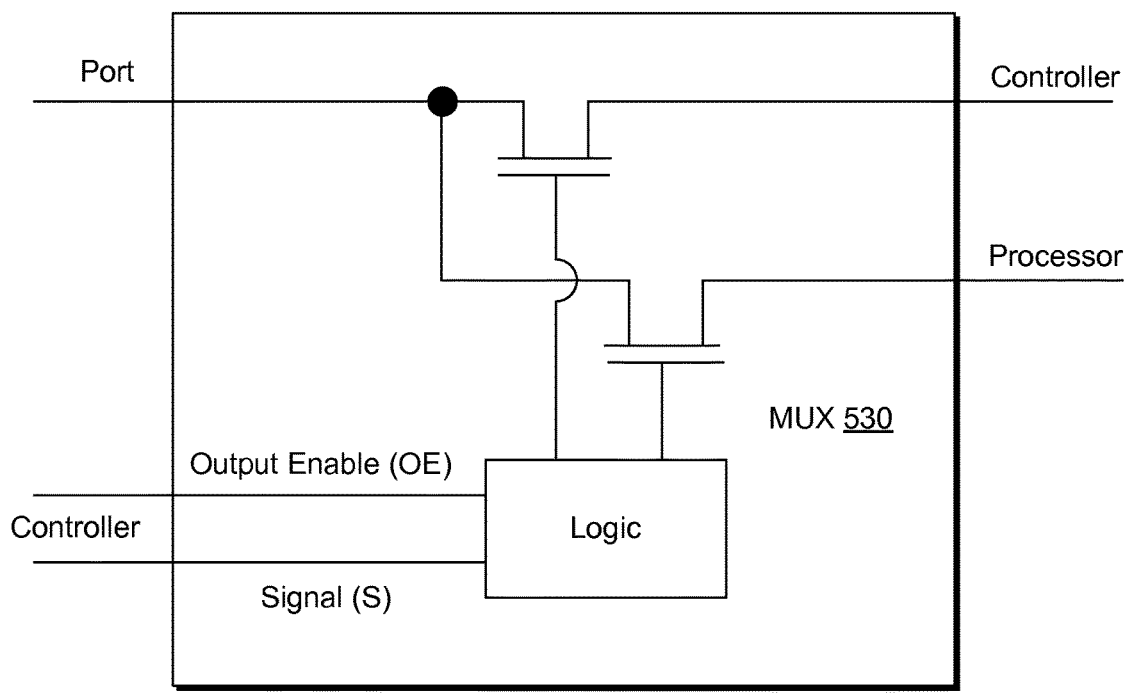
FIG. 6 is a diagram of an example of circuitry.

FIG. 6 shows an example of the multiplexer 530 (e.g., an example of multiplexer circuitry). In the example of FIG. 6, logic of the controller 550 may control the state of the multiplexer 530. For example, where the multiplexer 530 is in a processor coupled state and where the circuitry 570 in the processor path indicates that a device has been disconnected from the port 522, the circuitry 570 may signal the controller 550, which, in turn, may determine that the state of the multiplexer 530 is to be switched to the controller coupled state and to issue a signal (e.g., or signals) to the multiplexer 530 to switch the multiplexer 530 to the controller coupled state.

In the example of FIG. 6, the multiplexer 530 may be a one-to-two multiplexer. As an example, consider a multiplexer selected from the Texas Instruments CB family of multiplexers. For example, a system may include a Texas Instruments CB3Q multiplexer that may be a 4 bit multiplexer with 1-to-2 functionality to selectively direct one input to one of two outputs.

As shown in FIG. 6, the multiplexer 530 can include logic that receives signals such as an output enable signal (OE) and a state signal (S). As an example, such signals may be received from a controller such as the controller 550. As an example, the multiplexer 530 may be configured to direct input to a controller, for example, in a controller coupled state, as a default state. As an example, when enabled, the multiplexer 530 may switch from one state to another state responsive to receipt of one or more signals and corresponding logic. As an example, such switching may switch output to a controller path or switch output to a processor path. As an example, the multiplexer 530 may be considered to be a state machine.

Figure 7:
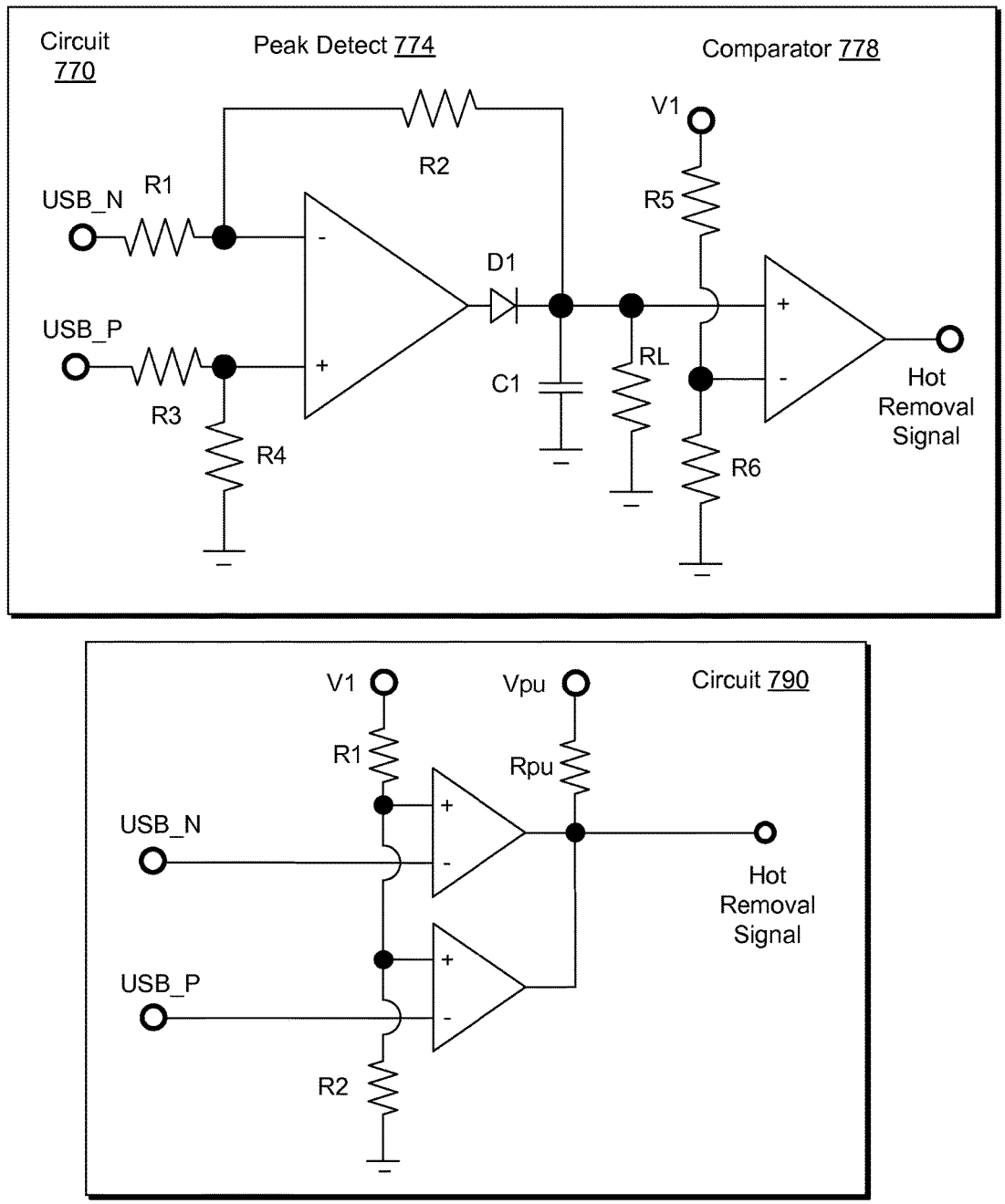
FIG. 7 is a diagram of examples of circuitry.

FIG. 7 shows an example of a circuit 770 and an example of a circuit 790, either or both of which may be, for example, part of a system (see, e.g., the system 500 of FIG. 5, etc.). As an example, the circuit 770 and/or the circuit 790 may be provided as (e.g., or as part of) the circuit 570 in the example of FIG. 5. As an example, the circuit 770 may provide a signal for switching a multiplexer (e.g., directly or indirectly). As an example, the circuit 790 may provide a signal for switching a multiplexer (e.g., directly or indirectly).

As shown in the example of FIG. 7, the circuit 770 may include a peak detect portion 774 and a comparator portion 778. Such a circuit may act to detect disconnection of a device from a data port such as a USB port. The peak detect portion 774 may provide for detection of a disconnection such as, for example, a disconnection of a device from a USB 2.0 port (e.g., referred to at times as "Hi-Speed"). For example, the peak detect portion 774 may use an operational amplifier to filter an AC signal to a DC level of peak voltage, for example, with a gain of unity. As an example, the resistors R1, R2, R3 and R4 may be about equal, for example, with a value of about 47,000 ohms or more. As an example, the resistor RL may have a value of about 1,000 ohms and the capacitor C1 may have a value of about 1 micro farad. As to the comparator portion 778, it may provide for detection of a peak above about 625 mV (see, e.g., section 7.1.7.3 of the USB 2.0 specification "downstream facing port must detect the high speed disconnect state when the amplitude of the differential signal at the port is ≥625 mV"; "downstream facing port must not detect the high speed disconnect stat when the amplitude of the differential signal at the port is <=525 mV"). In such an example, V1 may be a supply voltage of about 5 V while the resistor R5 may have a value of about 7,000 ohms and the resistor R6 may have a value of about 1,000 ohms. The circuit 770 may function as a "hot-remove" circuit that provides a signal when an active USB circuit is disconnected (e.g., a high signal, a low signal, etc.).

As an example, the circuit 770 may be considered to be a state machine that has particular states that depend on whether a device is operatively coupled to a data port or not operatively coupled to the data port. The circuit 770 may provide for state transitions (e.g., from one state to another state responsive to one or more events, signals, etc.).

As shown in FIG. 7, the circuit 790 may be considered a disconnect detection circuit that provides a signal upon disconnection of a device from a USB port (e.g., a high signal, a low signal, etc.). As an example, the circuit 790 may provide for detection of a disconnection such as, for example, a disconnection of a device from a USB 1.0 port (e.g., referred to at times as "Low-Speed" or "Full-Speed" or "Low-Bandwidth" or "Full-Bandwidth").

As shown in the example of FIG. 7, the circuit 790 can include two operational amplifiers and resistors R1, R2 and Rpu, which may have values of about 5,250 ohms, 1,000 ohms and 1,000 ohms, respectively. As an example, a voltage at V1 may be higher than a voltage at Vpu. As an example, the voltage V1 may be higher than a bus operating voltage (e.g., greater than 3 V, greater than 5 V, etc.). As an example, the voltage Vpu may be about 3 V, about 5 V, etc.

As an example, the circuit 790 may be considered to be a state machine that has particular states that depend on whether a device is operatively coupled to a data port or not operatively coupled to the data port. The circuit 790 may provide for state transitions (e.g., from one state to another state responsive to one or more events, signals, etc.).

Figure 8:
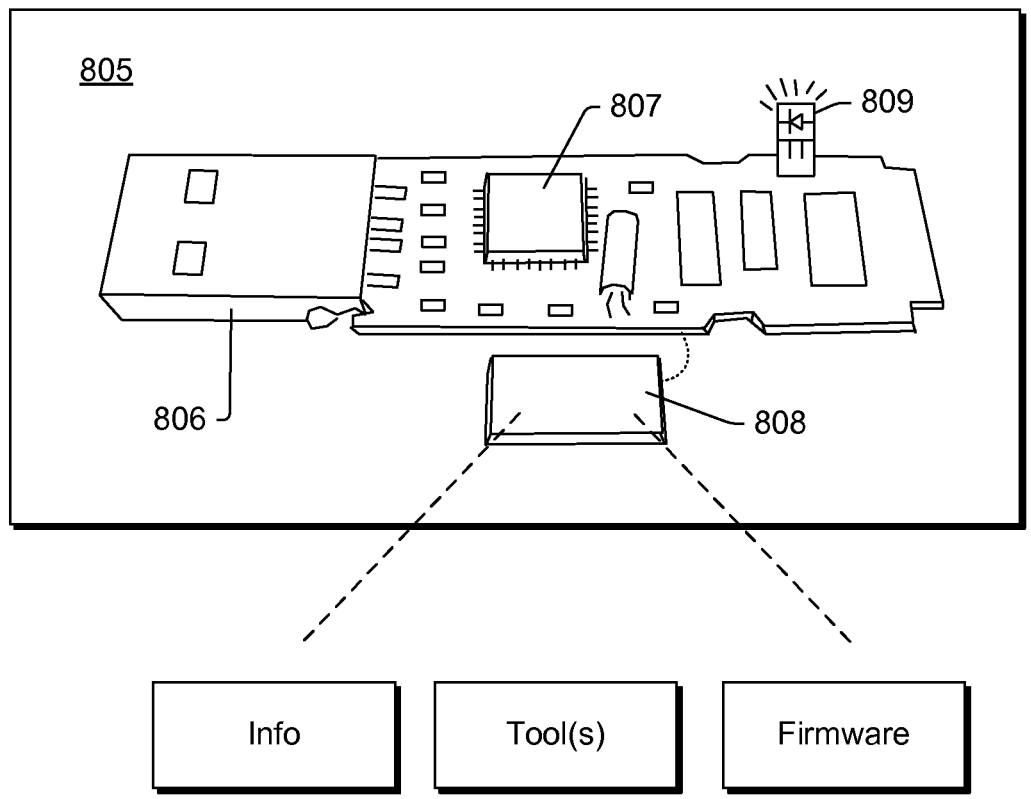
FIG. 8 is a diagram of an example of a USB device.

FIG. 8 shows an example of a device 805 that includes a data port connector 806 for operably coupling the device 805 to a data port. As an example, the device 805 may be a portable memory device. As an example, the device 805 may include one or more features of a portable memory device, which is configured as a USB device (e.g., shown in an approximate perspective view without an outer casing). For example, the data port connector 806 may be configured as a USB data port connector. As an example, the device 805 may include control circuitry 807 and memory 808 (e.g., one or more memory chips). In such an example, the control circuitry 807 may control reading and writing of information via the data port connector 806 to and from the memory 808.

In the example of FIG. 8, the device 805 is shown as optionally including notification circuitry 809. For example, the notification circuitry 809 may include a light emitting diode (LED) or other indicator that can indicate one or more states of the device 805. For example, the notification circuitry 809 may illuminate to indicate a connection state to a controller, a connection state to a processor, an authentication state (e.g., success, failure, etc.), etc.

In the example of FIG. 8, the device 805 may include information, one or more tools and firmware (e.g., for circuitry on a motherboard of a server, etc.). As an example, information in the memory 808 may identify the device 805, for example, according to a device ID. As an example, information in the memory 808 may include a key or other authentication information.

As an example, an apparatus can include a data bus connector; a data bus controller; an authentication code accessible via the data bus connector; memory accessible via the data bus connector; firmware for a baseboard memory controller stored in the memory; and circuitry that responds to a signal received via the data bus connector to indicate an authentication status of the authentication code for installation of the firmware in a baseboard memory controller. As an example, such a device may include an LED that illuminates to indicate an authentication status.

Figure 9:
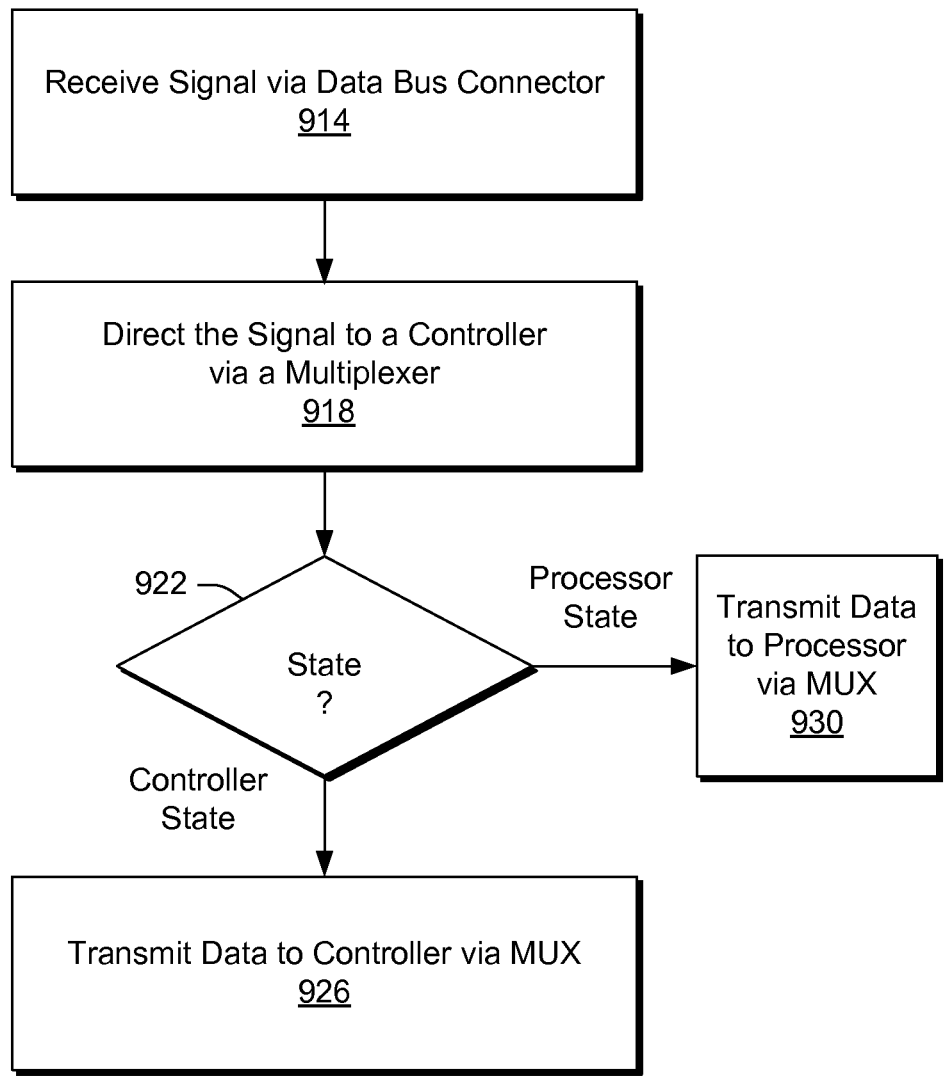
FIG. 9 is a diagram of an example of a method.

FIG. 9 shows an example of a method 900 that includes a reception block 914 for receiving a signal via a data bus connector, a direction block 918 for directing the signal to a controller via a multiplexer and a decision block 922 for determining a state, for example, based at least in part on the signal. As shown in the example of FIG. 9, the decision block 922 may decide that the determined state is a processor coupled state or a controller coupled state. Responsive to such a determination, per a transmit block 926, data received via the data bus connector may be transmitted to the controller via the multiplexer or, per a transmit block 930, data received via the data bus connector may be transmitted to a processor via the multiplexer.

As an example, a method can include receiving a signal via a data bus connector; directing the signal to a controller via a multiplexer; analyzing the signal; and responsive to analyzing the signal, configuring the multiplexer to operatively couple the data bus connector to a processor. In such an example, the signal may include data, for example, where the method includes analyzing the data. As an example, data may include an identification code for a device connected to the data bus connector. As an example, a method may include analyzing a signal and denying a device connected to a data bus connector access to a controller via a multiplexer.

As an example, a method may include, responsive to a hot removal signal, configuring a multiplexer to operatively couple a data bus connector to a controller. For example, consider a circuit (see, e.g., the circuit 770, the circuit 790, etc.) as providing a hot removal signal that may cause a multiplexer to be configured to operatively couple a data bus connector to a controller (e.g., a baseboard management controller). In such an example, the multiplexer may be in a default disconnected state and, for example, ready for determining an appropriate state upon connection of a device to the data bus connector (e.g., upon connection of a USB device to a USB port). As an example, whether an operational device and a system port connected state is a host connected state or a controller connected state for the device and the system port, a hot removal signal may help to ensure that the system is placed in an appropriate disconnected default state (e.g., system port connected to a controller of the system rather than a host of the system).

Figure 10:
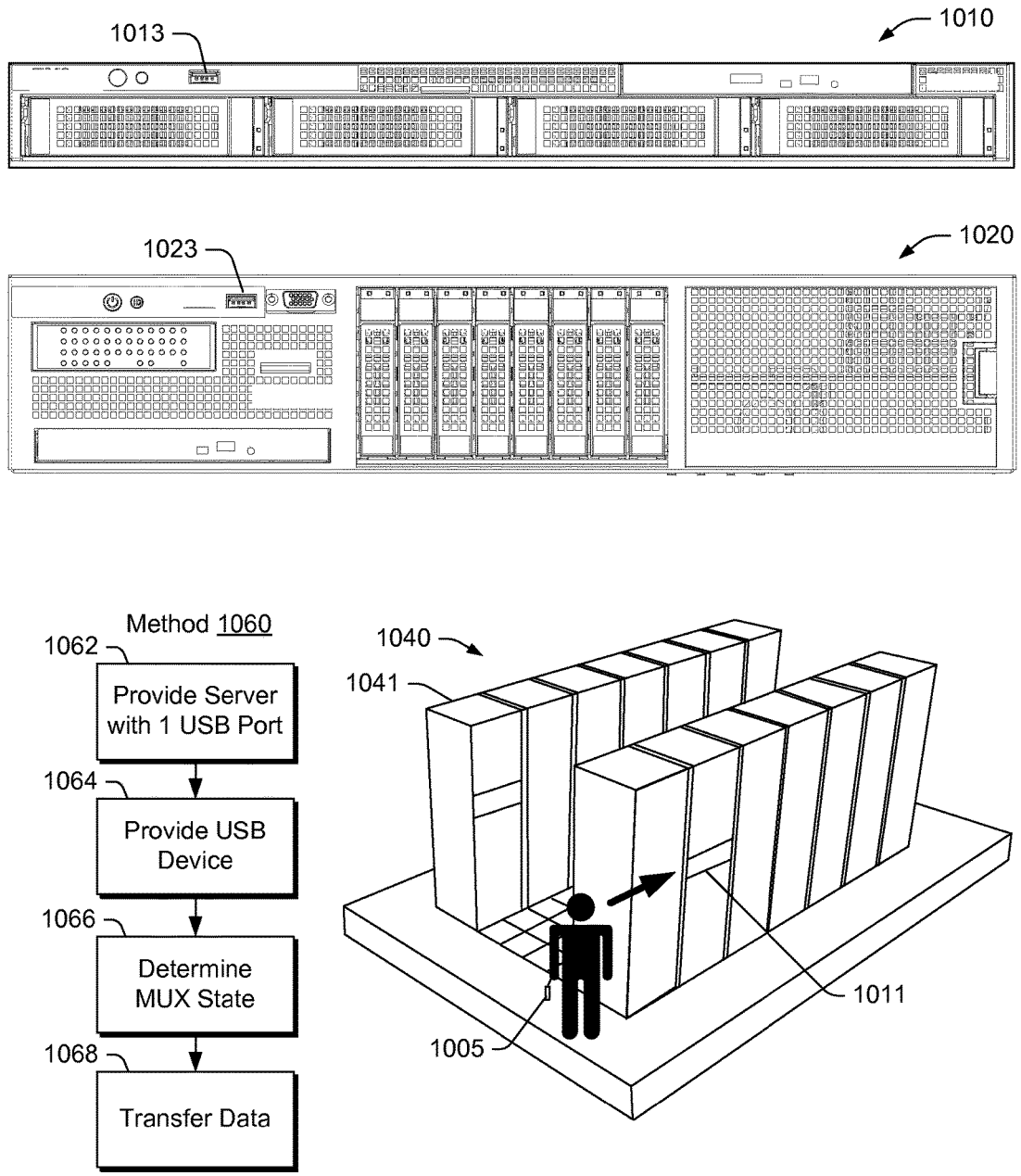
FIG. 10 is a diagram of examples of servers, an example of a system and an example of a method.

FIG. 10 shows examples of servers 1010 and 1020, an example of a system 1040 and an example of a method 1060. As shown in FIG. 10, each of the servers 1010 and 1020 includes a single USB port 1013 and 1023, respectively, on a front surface. As an example, a server may include more than one USB port, for example, where at least one of the USB ports includes associated circuitry for directing signals to a controller and/or a host. In such an example, the server may include a front-side USB port (e.g., optionally a single front-side USB port) with associated circuitry for directing signals to a controller and/or a host.

As an example, the system 1040 may include servers such as one or more of the server 1010, the server 1020, etc. Specifically, the system 1040 is shown as including racks 1041 where each rack can include servers. In the example of FIG. 10, a particular server 1011 is identified, for example, to be managed by a worker carrying a device 1005, which may be a USB device (see, e.g., the device 805 of FIG. 8).

As to the method 1060, it includes a provision block 1062 for providing a server with a single USB port on its front surface, a provision block 1064 for providing a USB device, a determination block 1066 for determining a state of a multiplexer of the server and a transfer block 1068 for transferring data from the USB device to the server where the data is transferred, for example, via the multiplexer to either a controller or a processor (e.g., based on a determination made by the determination block 1066).

As an example, a method may include receiving a signal via a single USB port and, in response thereto, issuing a notification via notification circuitry of a USB device coupled to the single USB port. For example, consider the notification circuitry 809 of the example device 805 of FIG. 8 that may respond to a signal issued by a controller. Such a signal may, for example, indicate denial of access to the controller, successful access to the controller, switching of state from a controller coupled state to a processor coupled state, etc.

As an example, the device 1005 in FIG. 10 may include a data table associated with controller firmware updates for one or more servers in the system 1040. In such an example, as each of the servers is updated, the data table may be updated as well. For example, a code in the data table may be altered such that if the device 1005 is inserted again into a server that has already had its controller firmware updated, the altered code prevents authorization of the device 1005. In other words, a multiplexer in the server may be switched to a processor coupled state for the device 1005 or the device 1005 may be otherwise denied access to the controller (e.g., and/or the processor).

As an example, a device may include a processor; a controller; a data bus connector; a multiplexer operatively coupled to the data bus connector where the multiplexer includes a controller coupled state operatively coupled to the controller and a processor coupled state operatively coupled to the processor; and circuitry that responds to a signal received via the data bus connector to determine the coupled state of the multiplexer as being one of the controller coupled state and the processor coupled state. In such an example, the data bus connector may be a USB connector. As an example, such a USB connector may be the only USB connector of the device (e.g., or the only front side USB connector of the device).

As an example, a signal may be or include a data packet. As an example, a signal may be or include an identification code.

As an example, a device may include circuitry that responds to a disconnection signal (e.g., a hot removal signal) associated with a data bus connector to determine the connected state of the multiplexer as being a controller connected state. As an example, a device may include authentication circuitry where, responsive to authentication of a signal, circuitry determines a connected state of a multiplexer as being a controller connected state. As an example, a controller may include circuitry such as authentication circuitry. Such circuitry may include access to a table or listing of devices and, for example, associated identification codes (e.g., a black list, a white list, etc.).

As an example, circuitry for purposes of controlling a multiplexer, authentication, etc. may be resident in a controller or operatively coupled to a controller. As an example, a chipset may be provided that includes a controller and a processor (e.g., of a host system).

As an example, a device or system may be a part of a vehicle. For example, consider a dashboard of a vehicle that includes a data port to which a multiplexer is operatively coupled for switching between two processors. In such an example, one processor may be associated with an engine control system (e.g., and/or a motor control system) while another processor may be associated with a media system (e.g., a media processor for music, video, graphics, voice commands, maps, phones, etc.). In such an example, the dashboard may include a single data port, which may be a USB data port. Such a data port may provide for servicing of the vehicle by an authorized service center via insertion of a device into the data port while also providing for transfer of media content, for example, to allow a media system of the vehicle to play songs, render video to a screen, etc. As an example, a processor may be a media processor and a controller may be a vehicle controller. For example, the processor 210 may be a media processor and the controller 250 may be a vehicle controller.

As an example, a data bus connector may include wireless communication circuitry. For example, a dongle may be connected to a USB port that provide for receipt of wireless data. In such an example, one or more signals may be analyzed to determine the state of a multiplexer with respect to a processor and a controller for transmission of data via the USB port.

As an example, a system may include a hypervisor, for example, executable to manage one or more operating systems. With respect to a hypervisor, a hypervisor may be or include features of the XEN® hypervisor (XEN-SOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable storage media. For example, one or more computer-readable storage media can include computer-executable (e.g., processor-executable) instructions to instruct a device. As an example, a computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 11:
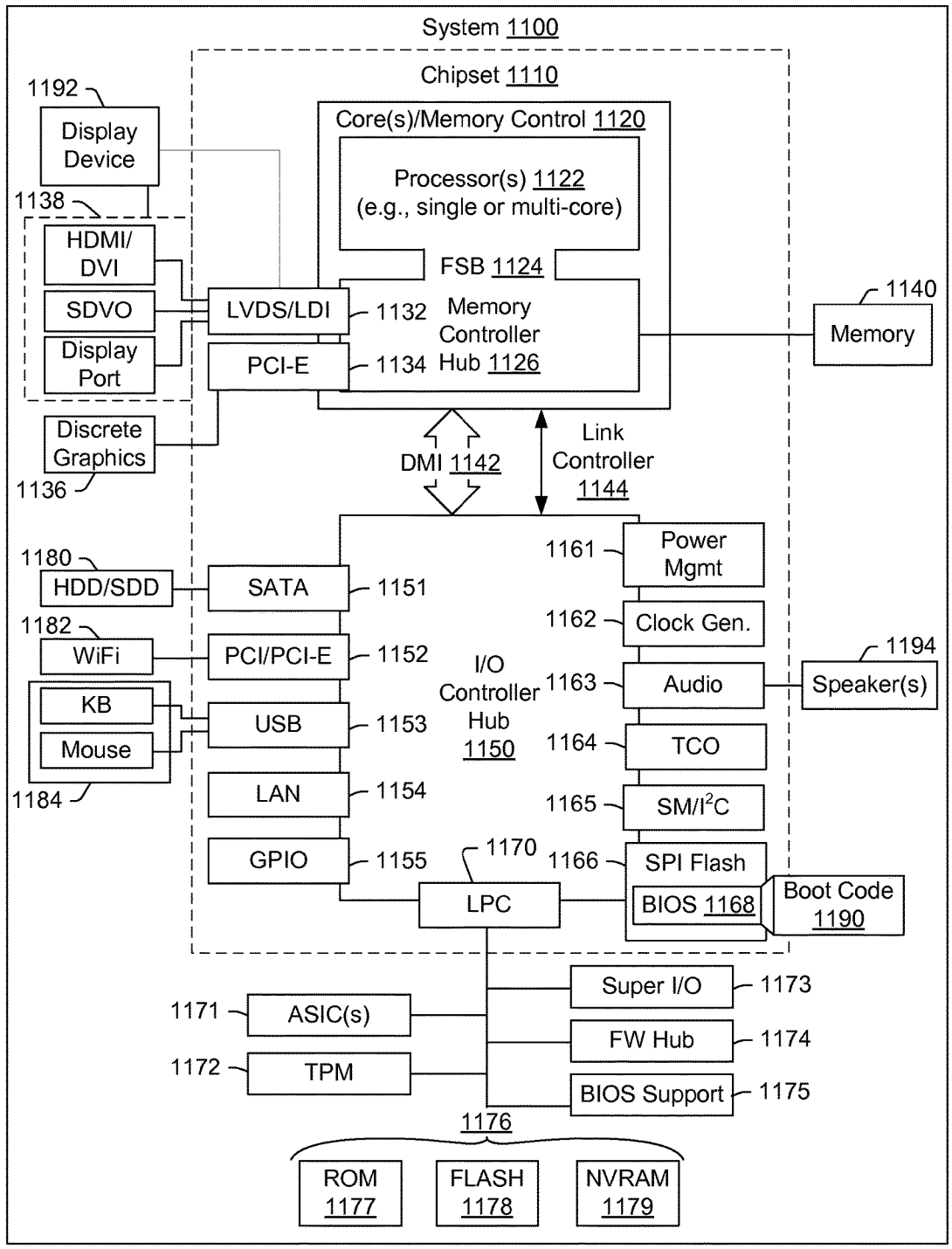
FIG. 11 is a diagram of an example of a machine, some or all of the features thereof may form part or all of a client, a server or other device or system.

While various examples circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100.

As shown in FIG. 11, the system 1100 includes a so-called chipset 1110. A chipset refers to a group of integrated circuits, or chips, that are designed to work together. Chipsets are usually marketed as a single product (e.g., consider chipsets marketed under the brands Intel®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory".

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCI-E) 1134, for example, for support of discrete graphics 1136. Discrete graphics using a PCI-E interface has become an alternative approach to an accelerated graphics port (AGP). For example, the memory controller hub 1126 may include a 16-lane (x16) PCI-E port for an external PCI-E-based graphics card. A system may include AGP or PCI-E for support of graphics.

The I/O hub controller 1150 includes a variety of interfaces. The example of FIG. 11 includes a SATA interface 1151, one or more PCI-E interfaces 1152 (optionally one or more legacy PCI interfaces), one or more USB interfaces 1153, a LAN interface 1154 (more generally a network interface), a general purpose I/O interface (GPIO) 1155, a low-pin count (LPC) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCI-E interface port. Other network features may operate independent of a PCI-E interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCI-E interface 1152 allows for wireless connections 1182 to devices, networks, etc. The USB interface 1153 provides for input devices 1184 such as keyboards (KB), mice and various other devices (e.g., cameras, phones, storage, media players, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system or component seeking access is the expected system or component.

The system 1100, upon power on, may be configured to execute boot code 1190 for the BIOS 1168, as stored within the SPI Flash 1166, and thereafter processes data under the control of one or more operating systems and application software (e.g., stored in system memory 1140).

As an example, the system 1100 may include circuitry for communication via a cellular network, a satellite network or other network. As an example, the system 1100 may include battery management circuitry, for example, smart battery circuitry suitable for managing one or more lithium-ion batteries.

CONCLUSION

Although various examples of methods, devices, systems, etc., have been described in language specific to structural features and/or methodological acts, it is to be understood that the subject matter defined in the appended claims is not necessarily limited to the specific features or acts described.

Rather, the specific features and acts are disclosed as examples of forms of implementing the claimed methods, devices, systems, etc.

What is claimed is:

1. A server comprising:
   a USB data port;
   a host processor;
   a controller;
   a multiplexer that comprises a processor coupled state of the USB data port to the host processor and a controller coupled state of the USB data port to the controller, wherein the controller coupled state is a default state;
   circuitry that comprises at least one operational amplifier, electrically between the multiplexer and the host processor, that, in the processor coupled state, responsive to disconnection of a USB device from the USB data port, issues a removal signal to the controller wherein, responsive to the removal signal, the controller switches the multiplexer to the controller coupled state as a controller waiting state for analysis, via the controller, of a USB device upon connection thereof to the USB data port;
   wherein, responsive to discovery of a USB device connected to the USB data port, the controller performs the analysis wherein the analysis scans the USB device to detect a signature;
   wherein, responsive to detection of a signature, the controller determines whether the signature matches a pre-determined signature; and
   wherein, responsive to a match of the signature and the pre-determined signature, the multiplexer is maintained in the controller coupled state, otherwise, the multiplexer is switched from the controller coupled state to the processor coupled state.

2. The server of claim 1 wherein, for a failure to detect a signature, the multiplexer is switched from the controller coupled state to the processor coupled state.

3. The server of claim 1 wherein, for a failure to match the signature and the pre-determined signature, the multiplexer is switched from the controller coupled state to the processor coupled state.

4. The server of claim 1 wherein the controller comprises a baseboard management controller (BMC).

5. The server of claim 1 wherein the host processor comprises a media processor and wherein the controller comprises a vehicle controller.

6. The server of claim 1 wherein, responsive to discovery of a USB device connected to the USB data port, the controller enumerates the USB device.

7. The server of claim 1 wherein the controller accesses the pre-determined signature.

8. The server of claim 1 wherein, responsive to a match of the signature and the pre-determined signature, the controller maintains the multiplexer in the controller coupled state.

9. The server of claim 8 wherein, otherwise, the controller switches the multiplexer from the controller coupled state to the processor coupled state.

10. A method comprising:
    via a controller of a server, switching a multiplexer of the server to a controller coupled state as a controller waiting state wherein the server comprises circuitry that comprises at least one operational amplifier, electrically between the multiplexer and a host processor of the server, that, in a processor coupled state, responsive to disconnection of a USB device from a USB data port of the server, issues a removal signal to the controller wherein, responsive to the removal signal, the controller switches the multiplexer to the controller coupled state as the controller waiting state for analysis, via the controller, of a USB device upon connection thereof to the USB data port;
    discovering a USB device connected to the USB data port;
    performing the analysis by scanning the USB device via the controller to detect a signature;
    responsive to detection of a signature, determining, via the controller, whether the signature matches a pre-determined signature; and
    responsive to a match of the signature and the pre-determined signature, maintaining the multiplexer in the controller coupled state, otherwise, operatively connecting the USB device to the host processor of the server via switching of the multiplexer from the controller coupled state to the processor coupled state.

11. The method of claim 10 wherein, for a failure to detect a signature, operatively connecting the USB device to the host processor of the server via switching of the multiplexer from the controller coupled state to a processor coupled state.

12. The method of claim 10 wherein, for a failure to match the signature and the pre-determined signature, operatively connecting the USB device to the host processor of the server via switching of the multiplexer from the controller coupled state to the processor coupled state.

13. The method of claim 10 wherein the controller comprises a baseboard management controller (BMC).

14. The method of claim 10 wherein the host processor comprises a media processor and wherein the controller comprises a vehicle controller.

15. The method of claim 10 comprising enumerating the USB device.

16. The method of claim 10 comprising accessing, via the controller, the pre-determined signature.

17. The method of claim 10 wherein, responsive to a match of the signature and the pre-determined signature, maintaining, via the controller, the multiplexer in the controller coupled state.

18. The server of claim 17 wherein, otherwise, operatively connecting, via the controller, the USB device to the host processor of the server via switching of the multiplexer from the controller coupled state to the processor coupled state.

* * * * *